Figure 1:
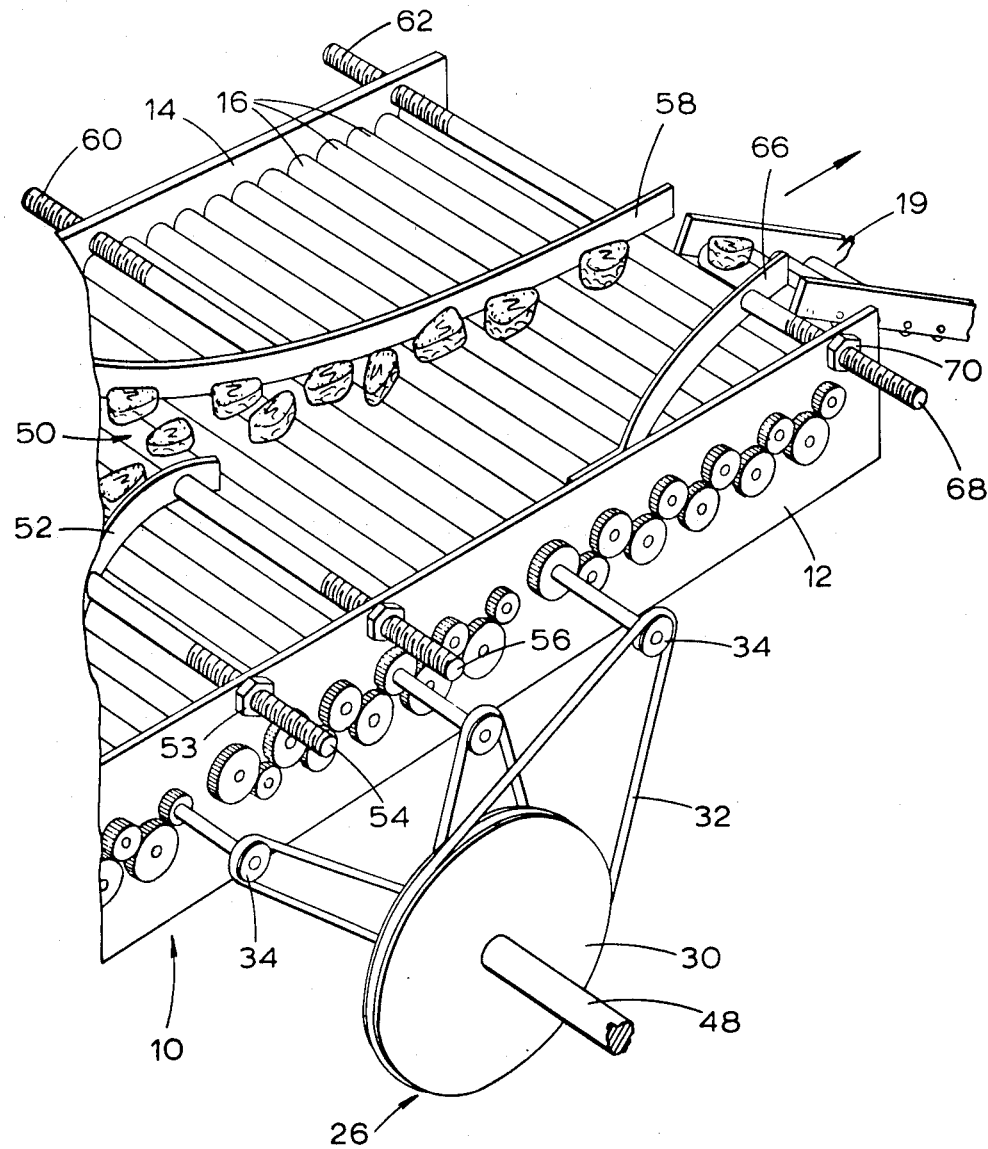

March 15, 1966 P. HOFER ETAL 3,240,311
CONVEYER FOR ARTICLES SUCH AS CONFECTIONS
Filed Dec. 5, 1963 2 Sheets-Sheet 1

Inventors
Peter Hofer
Peter Mehlin
by Michael J. Striker the articles from the supply means to the receiving means, and in addition the drive means rotates rollers which are United States Patent Office  3,240,311
Patented Mar. 15, 1966

3,240,311
CONVEYER FOR ARTICLES SUCH AS
CONFECTIONS
Peter Hofer, Weil (Rhine), and Peter Mehlin, Haagen, Kreis Lorrach, Germany, assignors, by mesne assignments, to Maschinenfabrik Winkler, Fallert & Co. AG., Berne, Switzerland, a corporation of Switzerland
Filed Dec. 5, 1963, Ser. No. 328,300
Claims priority, application Germany, Dec. 5, 1962, A 41,796
11 Claims. (Cl. 198—34)

The present invention relates to apparatus for handling articles such as confections and in particular relatively delicate articles such as confections in which an interior sweet substance is covered by chocolate, for example.

In order to efficiently pack articles of this type into containers, it is necessary that the articles reach the containers one by one so that a row of articles moving one behind the other reaches each container to be efficiently packed therein. In order to provide a satisfactory packing it is essential that accumulation of a pile of the confections or other articles be avoided. For this reason it is customary when handling such articles to employ personnel who manually control the feeding of the articles in such a way that they will not pile up and will instead be delivered in a single row to the structure which packs them into the containers. Up to the present time it has not been possible to provide a fully automatic packing of such articles even though the operating costs are very greatly increased as a result of the labor required for manually regulating the manner in which the articles reach the structure which packs them into the containers.

It is therefore a primary object of the present invention to provide an article handling apparatus which is capable of handling articles of the type discussed above in a fully automatic manner providing a transportation of the articles in such a way that they will indeed be distributed one behind the other when they reach the structure which packs them into the containers.

Another object of the present invention is to provide a structure of the above type which is adjustable so that it can be adapted for different types of articles.

It is also an object of the present invention to provide a structure which is capable of handling the articles rapidly so that a large number of articles will be delivered in a short time to the packing apparatus, and thus a high output is guaranteed with the structure of the invention.

Furthermore, it is an object of the invention to provide a structure which can be relied upon to handle extremely delicate articles such as chocolate-covered confections in which soft material is covered by the chocolate without in any way risking damage to the articles.

With these objects in view the invention includes, in an apparatus for handling articles such as confections, a supply means for supplying the articles in a layer in which the articles are closely spaced, and a receiving means located distant from the supply means for receiving the articles. A conveyor according to the invention is situated between the supply means and the receiving means with the front end of the conveyer adjoining the supply means and the rear end of the conveyor adjoining the receiving means, and this conveyor of the invention includes a support means which extends along a predetermined path between the supply means and the receiving means and a plurality of closely spaced parallel rollers supported for rotation by the support means and extending transversely across the predetermined path. A drive means is operatively connected to the rollers for rotating them all in the same direction so that they will transport the articles from the supply means to the receiving means, and in addition the drive means rotates rollers which are nearer to the receiving means than the supply means at a speed of rotation greater than rollers which are nearer to the supply means than the receiving means, so that in this way as the articles approach the receiving means they are transported at an increasing rate of speed resulting in spreading of the articles apart from each other, and a guide means is located over and closely adjacent to the roller for guiding the articles as they are transported by the rollers, the guide means and the rollers cooperating to arrange the articles in a single row one behind the other as they reach the rear end of the conveyer and are delivered to the receiving means.

Figure 2:
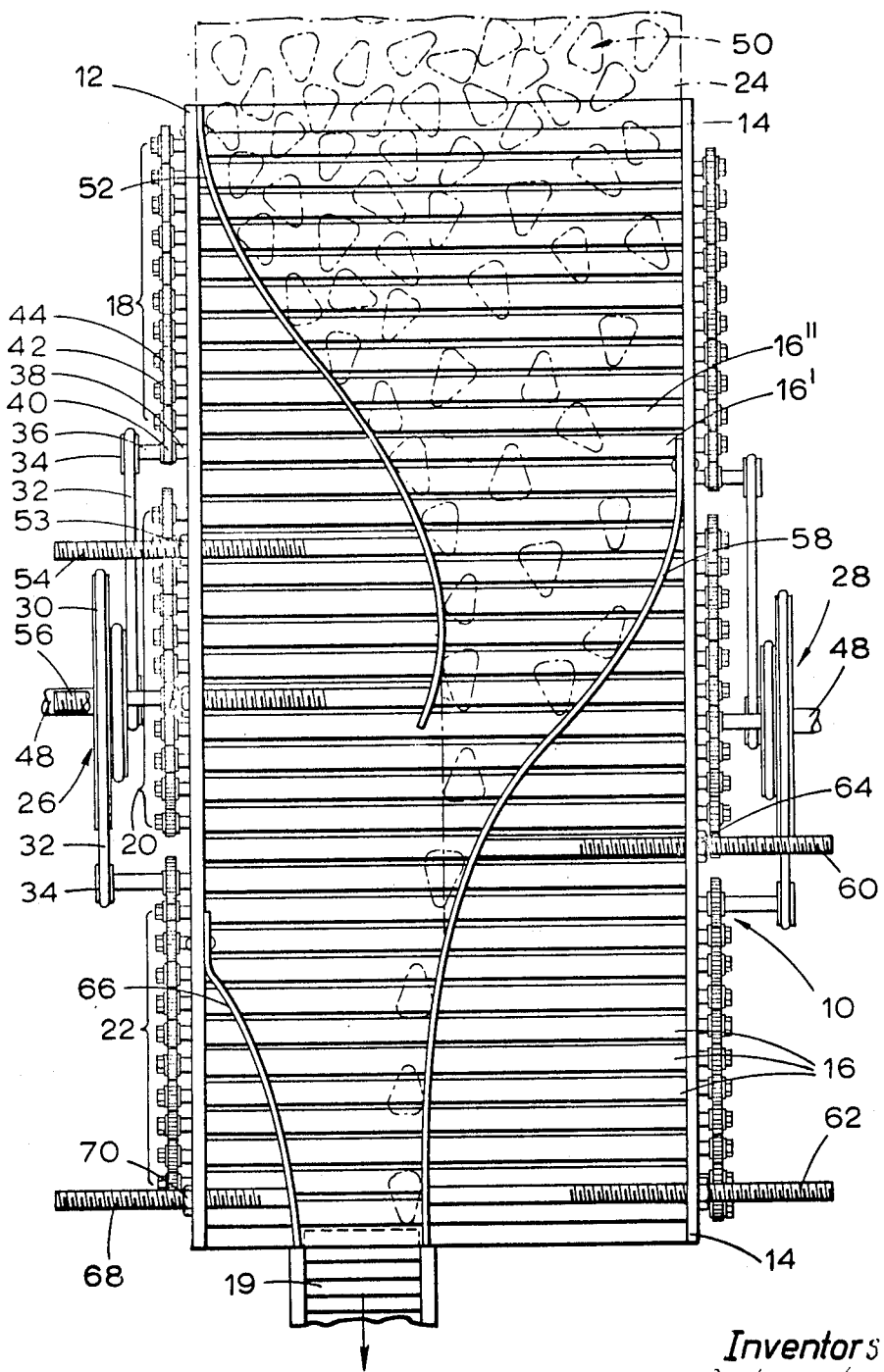

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective illustration of a conveyor structure according to the present invention, FIG. 1 illustrating the structure which extends up to the rear end of the conveyer and adjoins a receiving means to which the articles are delivered; and FIG. 2 is a top plan view illustrating the entire conveyer assembly of the invention and showing how it cooperates with a supply means and a receiving means for conveying articles from the supply means to the receiving means.

Referring now to the drawings, the conveyer illustrated therein includes a support means 10 which is in the form of a suitable framework, and this framework is provided with a pair of parallel spaced coextensive supports 12 and 14 which are in the form of elongated bars or walls, as illustrated. The conveyer also includes a plurality of transporting rollers 16 which are located close to each other, which are parallel to each other, and which are positioned substantially horizontally and supported for rotation by the supports 12 and 14 of the support means 10, each of the rollers 16 having a pair of reduced end portions extending through suitable bearings of the supports 12 and 14 beyond the latter so that free end portions of the several rollers are accessible outside of the space between the supports 12 and 14. The support means 10 extends along a predetermined path, as is apparent from FIG. 1 and 2, and the several rollers 16 extend transversely across this path.

The rear end of the conveyer is shown at the right in FIG. 1 adjoining a receiving means 19 which receives the conveyed articles, and the front end of the conveyer appears at the upper portion of FIG. 2 which this front end is shown adjoining a supply means 24 which supplies the articles 50 substantially in the form of a layer of these articles 50 with the articles 50 located closely adjacent to each other in the layer. The supply means 24 may take the form of an endless band conveyer, for example, on which the articles 50 are supported to be delivered from the supply means 24 to the front end of the conveyer of the invention, while the receiving means 19 may be in the form of a chute of known construction having a pair of side bars which support rollers for free rotation, and these rollers of the chute are not driven so that the articles which are received by the chute 19 move by gravity downwardly along the chute with the rollers thereof free to rotate so as to provide simply a rolling contact with the articles and to avoid any frictional rubbing of the articles.

A drive means is operatively connected to the rollers 16 for rotating them all in the same direction so that they will all participate in the transportation of the articles from the supply means 24 to the receiving means 19, and in addition the drive means of the invention drives the rollers 16 in such a way that those rollers 16 which are nearer to the receiving means 19 rotate at a higher rate of speed than those rollers 16 which are nearer to the supply means 24, and in this way as the articles are transported from the front toward the rear end of the conveyer they are spread apart from each other to be delivered in a row to the receiving means 19 to which the articles are delivered one behind the other as indicated in the drawings. In the particular example illustrated the rollers 16 are arranged in three groups with a front group rotating at a relatively low speed, an intermediate group rotating at a higher speed, and a rear group rotating at a still higher speed. From the receiving means 19 the articles are received by a suitable packing machine which is not illustrated. FIG. 2 indicates the three groups of rollers 18, 20, and 22 which are driven at different speeds as pointed out above, the front group of rollers 18 adjoining the supply means 24 for receiving the articles 50 therefrom. The speed of rotation of the rollers of the group 18 transports the articles at a speed greater than that with which they are delivered to the front end of the conveyer by the supply means 24, but of course this speed of transportation provided by the group of rollers 18 is smaller than that of the intermediate group 20, and of course the final group 22 rotates at a speed higher than the group 20.

The drive means includes a pair of stepped pulley assemblies 26 and 28 respectively located on opposite sides of the conveyer, as is particularly apparent from FIG. 2. Since there are three groups of rollers, each stepped pulley assembly includes three pulleys which are coaxially interconnected for rotation as a single unit. A single drive shaft 48 extends transversely across the conveyer beneath the rollers and is connected to a suitable driving motor which is not illustrated, and the pair of pulley assemblies 26 and 28 are both carried by the common drive shaft 48. On one side of the structure, such as at the side where the support 12 is located, a belt from the intermediate pulley of the assembly 26 is connected to a pulley which is fixedly carried by one of the rollers of the intermediate group 20. The belt 32 of the largest pulley 30 of the assembly is connected to a pulley 34 which is fixed to one of the rollers of the group 22, this latter roller having of course an extension for supportnig the pulley 34 which is fixed to this extension, and in the same way still another pulley 34 is fixed to an extension 36 of the portion 40 of the pulley 16' of the group 18, a belt 32 also connecting the smallest pulley of the stepped pulley assembly 26 to the pulley 34 which is fixed through the extension 36 of the portion 38 of the roller 16' indicated in FIG. 2.

This shaft portion 38 fixedly carries a gear 40 which meshes with an idler gear 42 supported for rotation by a shaft which is fixed to the support 12 at the exterior thereof, and this freely rotatable idler gear 42 meshes with a gear 44 which is fixed to a roller 16 which, it will be noted, is not next to the roller 16'. Thus, the gear transmission from the roller 16' which is positively driven is not transmitted to the next roller 16'' of the group 18 but instead skips the roller 16'' and is transmitted to the next roller to which the gear 44 is fixed, and in this way at the side of the conveyer where the support 12 is located the drive is transmitted to every other roller of the group 18, and of course the interposition of the idler gears 44 between the gears 40 which are fixed to every other roller provides rotation of every other roller in the same direction. At the other side of the conveyer where the support 14 is located, the drive is transmitted from the smallest pulley of the stepped pulley assembly 28 in the same way to the last one of the rollers of the group 18, this last roller having an extension to which a pulley is fixed and which cooperates with a band extending from the smallest pulley of the assembly 28, and the gear which is fixed to this last roller of the group 18 meshes with an idler gear supported for rotation by the support 14 at the outer side thereof and transmits the rotation not to the roller 16', which it will be recalled is directly driven by the pulley 34 shown at the upper left portion of FIG. 2, but instead to the gear which is fixed to the roller 16'', so that in this way those rollers which alternate with the rollers driven at one side of the conveyer are driven at the other side of the conveyer, and the two sets of alternating rollers which form each group all rotate in this way in the very same direction of rotation.

The above-described transmission for the group of rollers 18 is also provided for the group of rollers 20 and the group of rollers 22, the only difference being that the group of rollers 20 are driven by a pulley and belt drive at a higher speed than the group of rollers 18, and of course the largest pulley of the stepped pulley assembly at each side of the conveyer is connected to the rollers of the group 22 for driving the latter at the highest rates of speed.

Thus, with the structure described above the articles which are delivered to the conveyer will be transported at an increasing rate of speed as they approach the rear end of the conveyer to be delivered to the receiving means 19, and as a result the articles are spread apart from each other as they are moved along the conveyer.

The structure of the invention also includes a guide means for guiding the articles as they are transported by the rollers 16. The illustrated guide means takes the form of flexible curved guiding strips made of a plastic material, for example, and controlling the articles 50 as they are conveyed from the supply means 24 to arrange these articles in a single row so that they move one after the other to the receiving means 19. As is shown in FIG. 2 there is located adjacent to the supply means 24 an elongated flexible curved guiding strip 52 which is fixed at its front end to the support 12, and this curved guiding strip 52 is located over and closely adjacent to the rollers. Moreover, it will be seen that the guide strip 52 extends from the side of the conveyer where the support 12 is located to a location substantially midway between the sides of the conveyer. Therefore, all of the articles 50 which are received at the left side of the conveyer, as viewed in FIG. 2, will be guided by the strip 52 to a location situated approximately midway between the sides of the conveyer.

An adjusting means is operatively connected to the strip 52 for adjusting the curvature thereof, and this adjustings means in the illustrated example takes the form of a pair of rotary screw members 54 and 56 which extend threadedly through threaded openings formed in the support 12, and lock nuts 53 are provided for releasably locking the screws 54 and 56 in their adjusted positions. At their inner ends the screws 54 and 56 are connected to the strip 52 in such a way that the screws are free to turn relative to the strip 52 but remain connected thereto so that the strip 52 and the screw members 54 and 56 cannot become separated from each other. For example, the strip 52 may have a pair of integral pins which extend into bores formed in the ends of the screws 54 and 56, and these pins may each be provided with an annular groove into which the end of a set screw or pin fixed to the screws 54 and 56 extends, so that by the location of such a pin in an annular groove of a pin fixed to the strip 52 the screws 54 and 56 are free to turn relative to the strip 52 but cannot move axially away from or toward the latter. Any other suitable construction may be provided for connecting the screws to the strip for rotation relative thereto but preventing axial displacement of the strip and screws away from each other. By way of this adjusting means it is possible to give the curved guiding strip 52 the desired curvature which in the illustrated example is a substantially S-shaped curvature, as is apparent from FIG. 2.

The guide means of the invention includes a further curved guiding strip 58 which is fixed at its front end by a suitable rivet or the like to the support 14, and this strip 58 is also located over and closely adjacent to the rollers 16, and it will be noted that the front end portion of the strip 58 extends over some of the rollers over which the rear end portion of the strip 52 extends, while the strip 58 extends rearwardly all the way up to the receiving means 19. An adjusting means is also operatively connected to the strip 58 for adjusting the curvature thereof, and this adjusting means takes the form of a pair of screws 60 and 62 threadedly carried by the support 14 and connected to the strip 58 in the same way that the screws 54 and 56 are connected to the strip 52, and carrying lock nuts 64 so that the screws 60 and 62 can be releasably fixed in an adjusted position. It will be noted that the guide strip 58 extends from the side of the conveyer opposite to that to which the guide strip 52 is fixed upto a location where the rear end portion of the guide strip 52 is situated approximately midway between the opposite sides of the conveyer. Thus, those articles 50 which are received by the right side of the conveyer, as viewed in FIG. 2, will engage the guide strip 58 to be advanced thereby toward the center of the conveyer. Moreover, since both guide strips extend at least up to a location situated midway between the sides of the conveyer, those articles which move beyond the guide strip 52 after having engaged the latter will subsequently move into engagement with the guide strip 58 at the rear elongated end portion thereof. Thus, all of the articles will be engaged by the guide strip 58 while some of the articles will be engaged by the guide strip 52 to be guided thereby to positions where they will necessarily move into engagement with the rear end portion of the guide strip 58, and in this way the guide means controls the movement of the articles so that they will be arranged in a single row, the increasing speed of rotation of the rollers from the front toward the rear end of the conveyer spreading the articles apart from each other so that when they reach the receiving means 19 not only will the articles be in a single row but also they will be spaced from each other as illustrated in the drawings.

It will be noted that the guide strip 58 also has a substantially S-shaped curvature, and moreover the curvature of the guide strip 58 is the reverse of the curvature of the guide strip 52. The guide means includes a third strip 66 which is fixed at its front end to the support 12 and which can be adjusted by a screw 68 connected in the manner described above to the strip 66 and capable of being maintained in the adjusted position by the lock nut 70, this screw 68 of course extending through a threaded opening of the support 12. The outer ends of all of the adjusting screws may have a non-circular configuration so that a suitable tool such as a wrench can be applied thereto for turning the screws, or any suitable handles may be connected to the outer ends of the screws. It will be noted that the curved guide strip 66 defines with the elongated rear end portion of the guide strip 58 an elongated, tapered, substantially funnel-shaped exit passage through which the articles are transported to the receiving means 19, so that in this way all of the articles will necessarily be guided to the receiving means 19.

It is also to be noted that the increasing speeds of rotation of the rollers 16 from the front toward the rear of the conveyer and the guide means formed by the above-described curved strips 52 and 58 serve not only to provide a single row of articles because the articles are spread apart from each other and guided by the guide strips into a single row, but in addition this construction will provide substantially equal spacing between the row of articles which reach the receiving means 19. The adjusting means formed by the above-described screws which are connected to the guide strips enable the latter to be positioned in accordance with the size of the articles and the desired formation in which they are to be arranged when they reach the receiving means. Also, it will be seen that the adjustment particularly of the guide means 58 determines the path along which the row of articles move when they are received by the receiving means 19.

It will thus be seen that with the structure of the invention a fully automatic handling of the articles is provided and at the same time the results which were formerly achieved by manual operations are now achieved automatically in a fully reliable manner. The above-described structure of the invention is particularly suited for delicate articles such as confections. The reason for this is that the several rollers 16 will have a substantially line-contact with the articles so that the area of contact between the articles and the conveyer is reduced to a minimum, and because of this line contact of the rollers with the articles it is possible for the articles to move with a minimum of friction while sliding along the guide strips. This is in sharp contrast, for example, with conveyers where the articles are guided while resting on bands. Where such conveyer bands are used the entire bottom surface of the article is in frictional engagement with the band, and if the article is then shifted transversely of the band by guides such as the above-described guide strips, then of course there is so much frictional resistance to movement of relatively delicate soft articles that they easily become wedged between the conveyer bands and the guide strips so that not only do the articles become destroyed but in addition there is a considerable mess which greatly detracts from the speed with which the operations can be carried out. Thus, where relatively soft delicate articles are used the line-contact provided by the rollers enables the articles to be guided without any danger of damaging the articles.

Moreover, the use of a pair of guide strips such as the guide strips 52 and 58, in accordance with the present invention, is of a particular advantage since it enables the length of the conveyer to be greatly reduced. It might be possible, for example, to produce the desired results with a single guide strip, but in this case it would be necessary for such a single guide strip to have an extremely long length in order to afford the articles an opportunity to arrange themselves in a single row before reaching the receiving means. This would require the length of the entire conveyer to be increased undesirably and in addition would require a far greater length of time for the articles to reach the receiving means. On the other hand, where a pair of strips such as the strips 52 and 58 are used, the entire length of the conveyer need not be so long and the strips themselves can be of a relatively shorter length, and the articles are conveyed in a shorter period of time while at the same time the desired arrangement of the articles spaced from each other in a single row is achieved.

It is to be noted that the use of a pair of guide strips not only makes it possible to provide a far more compact conveyer which handles the articles in a lesser period of time, but in addition as compared to a structure where endless bands are used, the use of rollers also provides a far more compact and less expensive construction.

With respect to the operation of the pair of guide strips to shift the articles toward the center of the conveyer midway between the sides thereof, it is pointed out that in effect there will be a single row of articles provided by the guide strip 52 and a single row of articles provided by the guide strip 58, and the row which moves rearwardly beyond the guide strip 52 will become joined with the row formed by the guide strip 58, and it will be noted that this single row which combines the two rows formed by the pair of guide strips has the articles therein spread apart from each other by the rollers 16 of the last group 22, so that in this way a single row of articles spaced from each other will reach the receiving means 19.

It will be understood that each of the elements described above, or two or more together, may also find a useful application in other types of conveyers differing from the types described above.

While the invention has been illustrated and described as embodied in conveyers for confections and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for handling articles such as confections or the like, in combination, supply means for supplying the articles substantially in the form of a layer of said articles in which the articles are located close to each other; receiving means distant from said supply means for receiving the articles; and a conveyer extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyer, and guide means located closely adjacent to and over said rollers for guiding the articles transported thereby to said receiving means, said guide means including an elongated curved guiding strip carried by said support means over and in close proximity to said rollers and having an end located directly next to said receiving means.

2. In an apparatus for handling articles such as confections or the like, in combination, supply means for supplying the articles substantially in the form of a layer of said articles in which the articles are located close to each other; receiving means distant from said supply means for receiving the articles; and a conveyer extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyer, and guide means located closely adjacent to and over said rollers for guiding the articles transported thereby to said receiving means, said guide means including an elongated curved guiding strip carried by said support means over and in close proximity to said rollers and having an end located directly next to said receiving means, and said guide means including a second curved strip also supported by said support means over and in close proximity to said rollers, said second curved strip having a curvature which is the reverse of the curvature of said first-mentioned strip.

3. In an apparatus for handling articles such as confections or the like, in combination, supply means for supplying the articles substantially in the form of a layer of said articles in which the articles are located close to each other; receiving means distant from said supply means for receiving the articles; and a conveyer extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyer, and guide means located closely adjacent to and over said rollers for guiding the articles transported thereby to said receiving means, said guide means including an elongated curved guiding strip carried by said support means over and in close proximity to said rollers and having an end located directly next to said receiving means, and said guide means including a second curved strip also supported by said support means over and in close proximity to said rollers, said second curved strip having a curvature which is the reverse of the curvature of said first-mentioned strip, said strips having a substantially S-shaped curvature.

4. In an apparatus for handling articles such as confections or the like, in combination, supply means for supplying the articles substantially in the form of a layer of said articles in which the articles are located close to each other; receiving means distant from said supply means for receiving the articles; and a conveyor extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyer, and guide means located closely adjacent to and over said rollers for guiding the articles transported thereby to said receiving means, said guide means including an elongated curved guiding strip carried by said support means over and in close proximity to said rollers and having an end located directly next to said receiving means, and said guide means including a second curved strip also supported by said support means over and in close proximity to said rollers, said second curved strip having a curvature which is the reverse of the curvature of said first-mentioned strip, said second strip being located nearer to the front end of said conveyer than said first-mentioned strip, and said rollers during rotation transporting articles which move beyond said second strip into engagement with said first-mentioned strip.

5. In an apparatus for handling articles such as confections or the like, in combination, supply means for supplying the articles substantially in the form of a layer of said articles in which the articles are located close to each other; receiving means distant from said supply means for receiving the articles; and a conveyer extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyer, and guide means located closely adjacent to and over said rollers for guiding the articles transported thereby to said receiving means, said guide means including an elongated curved guiding strip carried by said support means over and in close proximity to said rollers and having an end located directly next to said receiving means, and said guide means including a second curved strip also supported by said support means over and in close proximity to said rollers, said second curved strip having a curvature which is the reverse of the curvature of said first-mentioned strip, and said guide means including a third curved strip carried by said support means over and closely adjacent to said rollers and located at the rear end portion of said conveyer, said third strip defining with said first strip a tapered substantially funnel-shaped exit for the articles from said rollers to said receiving means.

6. Apparatus for handling articles such as confections, comprising, in combination, supply means for supplying said articles substantially in the form of a layer in which the articles are located relatively close to each other; receiving means distant from said supply means for receiving the articles; and a conveyer having a front end adjoining said supply means and a rear end adjoining said receiving means for conveying articles from said supply means to said receiving means, said conveyer comprising elongated support means extending along a predetermined path between said supply means and said receiving means, a plurality of parallel substantially horizontal, closely spaced rollers distributed along said path between said supply means and receiving means and extending transversely across said path, said support means supporting said rollers for rotation; drive means operatively connected to said rollers for rotating all of said rollers in the same direction to transport the articles from said supply means to said receiving means, said rollers being divided into at least two groups one of which is closer to said rear end of said conveyer than the other, and said drive means driving said one group of rollers at a speed of rotation greater than that of said other group of rollers so that as the articles are transported by said rollers they are spread apart from each other to reach said receiving means arranged in a line where said articles are located one behind the other, and at least two elongated curved guide strips carried by said support means over and closely adjacent to said rollers for guiding the articles from said supply means to said receiving means as they are transported by said rollers, said conveyer having opposed sides between which said rollers extend and one of said guide strips extending from the region of said supply means and from one side of said conveyer rearwardly toward said receiving means while also extending from said one side of conveyer at least up to a location situated substantially midway between the opposed sides of said conveyer, and the other of said strips extending from the other side of said conveyer rearwardly of said supply means up to said receiving means while also extending from said other side of said conveyer to a location located substantially midway between said sides of said conveyer, whereby the articles which are received by the front end of said conveyer will be guided by said one strip from said one side of said conveyer toward a location substantially midway between said sides as the articles are rearwardly conveyed toward said receiving means and the articles in the region of the other side of said conveyer being guided by said other strip away from said other side of said conveyer toward a location substantially midway between said sides of said conveyer, so that both of said strips cooperate to provide a single row of articles which reach said receiving means arranged one behind the other in said row.

7. Apparatus for handling articles such as confections, comprising, in combination, supply means for supplying said articles substantially in the form of a layer in which the articles are located relatively close to each other; receiving means distant from said supply means for receiving the articles; and a conveyer having a front end adjoining said supply means and a rear end adjoining said receiving means for conveying articles from said supply means to said receiving means, said conveyer comprising elongated support means extending along a predetermined path between said supply means and said receiving means, a plurality of parallel substantially horizontal, closely spaced rollers distributed along said path between said supply means and receiving means and extending transversely across said path, said support means supporting said rollers for rotation; drive means operatively connected to said rollers for rotating all of said rollers in the same direction to transport the articles from said supply means to said receiving means, said rollers being divided into at least two groups one of which is closer to said rear end of said conveyer than the other, and said drive means driving said one group of rollers at a speed of rotation greater than that of said other group of rollers so that as the articles are transported by said rollers they are spread apart from each other to reach said receiving means arranged in a line where said articles are located one behind the other, and at least two elongated curved guide strips carried by said support means over and closely adjacent to said rollers for guiding the articles from said supply means to said receiving means as they are transported by said rollers, said conveyer having opposed sides between which said rollers extend and one of said guide strips extending from the region of said supply means and from one side of said conveyer rearwardly toward said receiving means while also extending from said one side of conveyer at least up to a location situated substantially midway between the opposed sides of said conveyer, and the other of said strips extending from the other side of said conveyer rearwardly of said supply means up to said receiving means while also extending from said other side of said conveyer to a location located substantially midway between said sides of said conveyer, whereby the articles which are received by the front end of said conveyer will be guided by said one strip from said one side of said conveyer toward a location substantially midway between said sides as the articles are rearwardly conveyed toward said receiving means and the articles in the region of the other side of said conveyer being guided by said other strip away from said other side of said conveyer toward a location substantially midway between said sides of said conveyer, so that both of said strips cooperate to provide a single row of articles which reach said receiving means arranged one behind the other in said row, and adjusting means carried by said support means and operatively connected to said strips for adjusting the curvature thereof.

8. A conveyer for articles such as confections, comprising, in combination, a pair of spaced, parallel, coextensive supports; a plurality of rollers extending between said support, being parallel to each other and located close to each other, and being supported for rotary movement by said supports, each of said rollers extending through said pair of supports and having a pair of end portions located beyond said pair of supports, and said rollers forming at least two groups of rollers; a plurality of gears fixed to all of the ends of said rollers; a plurality of idler gears rotatably carried by said supports and transmitting rotation at one of said supports between every other one of said rollers of said groups and at the other of said supports between the rollers which alternate with every other one of said rollers which are interconnected by said gears and idlers at said one of said supports; a single rotary drive shaft supported for rotation by said pair of supports and extending beneath said rollers and having a pair of elongated portions extending beyond said supports; a pair of stepped pulley assemblies carried by said drive shaft at the portions thereof which extend beyond said supports, respectively; and pulley and belt means connecting the stepped pulleys to one of the shafts of each group at one side of said pair of supports and to another one of the shafts of each group at the other side of the pair of supports and providing a drive for one of said groups which rotates the rollers of said one group at a speed higher than the speed of rotation of the rollers of the other group, said gears and idlers providing for all of said rollers a single direction of rotation.

9. A conveyor for articles such as confections, comprising, in combination, a pair of spaced, parallel, coextensive supports; a plurality of rollers extending between said supports, being parallel to each other and located close to each other, and being supported for rotary movement by said supports, each of said rollers extending through said pair of supports and having a pair of end portions located beyond said pair of supports, and said rollers forming at least two groups of rollers; a plurality of gears fixed to all of the ends of said rollers; a plurality of idler gears rotatably carried by said supports and transmitting rotation at one of said supports between every other one of said rollers of said groups and at the other of said supports between the rollers which alternate with every other one of said rollers which are interconnected by said gears and idlers at said one of said supports; a single rotary drive shaft supported for rotation by said pair of supports and extending beneath said rollers and having a pair of elongated portions extending beyond said supports; a pair of stepped pulley assemblies carried by said drive shaft at the portions thereof which extend beyond said supports, respectively; pulley and belt means connecting the stepped pulleys to one of the shafts of each group at one side of said pair of supports and to another one of the shafts of each group at the other side of the pair of supports and providing a drive for one of said groups which rotates the rollers of said one group at a speed higher than the speed of rotation of the rollers of the other group, said gears and idlers providing for all of said rollers a single direction of rotation; a pair of flexible elongated guide strips each connected at one end to said pair of supports and located over said rollers closely adjacent thereto; and a pair of screw members threadedly carried by said supports and operatively connected to said strips for adjusting the curvature thereof.

10. In an apparatus for handling articles such as confections or the like, in combination, supply means for supplying the articles substantially in the form of a layer of said articles in which the articles are located close to each other; receiving means distant from said supply means for receiving the articles; and a conveyor extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyor, and guide means including a guide member located closely adjacent to and over said rollers, said guide member having an elongated guide surface inclined with respect to said predetermined path and extending transversely across a portion of said path so as to constrict the effective width of said path along which the articles are transported by said conveyor to said receiving means.

11. In an apparatus for handling articles such as confections or the like, in combination, supply means for supplying the articles substantially in the form of a layer of said articles in which the articles are located close to each other; receiving means distant from said supply means for receiving the articles; and a conveyer extending between said supply means and receiving means and having a front end adjoining said supply means for receiving the articles therefrom and a rear end adjoining the receiving means for delivering the articles to said receiving means, said conveyer comprising an elongated support means extending along a predetermined path between said supply means and receiving means, said conveyer having a pair of longitudinal edge portions parallel with said path and a plurality of substantially horizontal rollers located close to each other and being parallel to each other and extending transversely to said path, said support means supporting said rollers for rotary movement, drive means operatively connected to said rollers for rotating said rollers in the same directions of rotation, respectively, for transporting the articles from said supply means to said receiving means, said drive means driving rollers which are nearer to said receiving means at a higher speed of rotation than rollers which are nearer to said supply means so that the articles are spread apart from each other to prevent damaging contact with each other as they are transported by said rollers and will move one behind the other to said rear end of said conveyer, and guide means including a guide member located closely adjacent to and over said rollers, said guide member having an elongated guide surface inclined with respect to said predetermined path and extending in the direction of movement of the articles along said predetermined path, from one longitudinal edge portion of said conveyer toward but short of the other longitudinal edge portion so as to constrict the effective width of said path along which the articles are transported by said conveyer to said receiving means.

References Cited by the Examiner

UNITED STATES PATENTS

| | | | |
|---|---|---|---|
| 866,337 | 9/1907 | Cowley | 198—38 |
| 2,765,065 | 10/1956 | Liebelt | 198—127 X |

HUGO O. SCHULZ, *Primary Examiner.*

WILLIAM B. LA BORDE, SAMUEL F. COLEMAN, *Examiners.*

R. E. KRISHER, *Assistant Examiner.*